UNITED STATES PATENT OFFICE.

A. GIBBS CAMPBELL, OF PATERSON, NEW JERSEY.

IMPROVEMENT IN PORTABLE TOILET WATERS AND EXTRACTS.

Specification forming part of Letters Patent No. 162,529, dated April 27, 1875; application filed March 8, 1875.

*To all whom it may concern:*

Be it known that I, A. GIBBS CAMPBELL, of Paterson, in the county of Passaic and State of New Jersey, have invented a new and useful Improvement in the Production of Portable Toilet-Waters and Toilet-Extracts, of which the following is a specification:

The object of this invention is to provide, in a convenient portable shape, readily transmissible by mail, a means for the speedy production of various toilet-waters and toilet-extracts of greater or less strength, at the option of the consumer, and at the same time to effect a saving of the cost of transportation of spirits, which constitute the great part of the bulk of toilet-waters already manufactured.

As illustrations of my invention I give herewith the proportions of ingredients, and the method of procedure in the production and application of some examples of my invention.

For cologne-water, I first mix, say, three ounces of attar of bergamot, two drams of attar of neroli, and one dram of attar of rose. This mixture of fragrant attars I pour upon four ounces of carbonate of magnesia, which readily absorbs the same, and I then reduce the whole to powder by trituration in a mortar.

The result of this operation is the production of a dry powder, which will retain its virtues indefinitely if kept in air-tight packages, may be transmitted by mail, or otherwise transported at small cost, and can at any time be made into cologne-water or cologne-extract by maceration in alcohol, the quantity above mentioned being sufficient for the production of one gallon of cologne-water, or of one quart of cologne-extract, the alcohol dissolving the fragrant attars, and the undissolved carbonate of magnesia being removed by filtration through paper, which leaves the toilet-water or toilet-extract in proper condition for use.

A rose-geranium toilet-water or toilet-extract is prepared by the same method, using the same quantity of carbonate of magnesia, two ounces of attar of geranium, and two drams of attar of rose.

By macerating the above quantity in one gallon of alcohol a fine quality of rose-geranium water will be produced, or a quart of extract of rose-geranium by using one quart of alcohol.

Instead of carbonate of magnesia, prepared chalk, or any other suitable absorbent material insoluble in alcohol, may be employed; but I consider carbonate of magnesia to be the best for general use.

As the fragrant attars will yield readily to the solvent power of alcohol when the carbonate, or other absorbent which holds them, is in the form of lumps or blocks, the trituration into powder is not essential, provided care be exercised that a specific quantity of the absorbent be charged with a specific quantity of the odorous substances, in order that uniform results may be obtained in the subsequent manufacture of the prepared substance into toilet-waters or toilet-extracts.

I do not limit or confine myself to the toilet waters and extracts herein specified, or to the exact ingredients or proportions herein mentioned, since these may be varied more or less.

Having thus described my invention, I claim as new and desire to secure by Letters Patent—

As an improved article of manufacture, a compound for the production of toilet waters or extracts by lixiviation with alcohol, the compound consisting of a mixture of carbonate of magnesia with one or more fragrant attars.

A. GIBBS CAMPBELL.

Witnesses:
GEORGE ROWLEE,
JOHN RAMAGE.